United States Patent
Smith (10) Patent No.: US 7,139,353 B2
(45) Date of Patent: Nov. 21, 2006

(54) BOILING WATER REACTOR NUCLEAR FUEL ASSEMBLY LIFTING SUPPORT

(75) Inventor: Mark Smith, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 10/313,845

(22) Filed: Dec. 6, 2002

(65) Prior Publication Data

US 2004/0109522 A1  Jun. 10, 2004

(51) Int. Cl.
G21C 7/06 (2006.01)

(52) U.S. Cl. .............. 376/233; 376/260; 376/264; 294/6; 74/503; 414/1

(58) Field of Classification Search .............. 376/261, 376/268, 260, 262, 444, 446, 233, 264
See application file for complete search history.

(56) References Cited

U.S. PATENT DOCUMENTS

| | | | |
|---|---|---|---|
| 4,077,661 A * | 3/1978 | Inahashi | 294/82.3 |
| 4,295,765 A | 10/1981 | Burke | |
| 4,331,321 A | 5/1982 | Laupper | |
| 4,539,174 A * | 9/1985 | Patenaude | 376/261 |
| 4,820,472 A | 4/1989 | Machado et al. | |
| 5,064,606 A * | 11/1991 | Go | 376/261 |
| 5,245,643 A * | 9/1993 | Dix et al. | 376/371 |
| 5,284,374 A * | 2/1994 | Szkrybalo et al. | 294/86.4 |
| 5,420,899 A * | 5/1995 | Apple et al. | 376/261 |
| 5,646,973 A * | 7/1997 | Proebstle et al. | 376/434 |
| 5,748,695 A * | 5/1998 | Dunlap et al. | 376/446 |
| 5,950,761 A | 9/1999 | Murphy | |
| 5,961,266 A * | 10/1999 | Tseng | 411/383 |
| 6,347,130 B1 * | 2/2002 | Nylund | 376/433 |
| 6,385,271 B1 * | 5/2002 | Nylund | 376/439 |
| 6,404,836 B1 | 6/2002 | Matteson | |
| 6,508,450 B1 | 1/2003 | Hayde | |

* cited by examiner

Primary Examiner—Ricardo Palabrica
(74) Attorney, Agent, or Firm—Kenyon & Kenyon LLP (57) ABSTRACT

A lifting support for a boiling water reactor nuclear fuel assembly comprising a grappling head configured to allow attachment to a lifting device, a body with an upper end and a lower end, the upper end connected to the grappling head, the body configured to be inserted into a water channel of a boiling water reactor nuclear fuel assembly, and an end connected to the lower end, the end configured to be accepted by the nuclear fuel assembly.

12 Claims, 7 Drawing Sheets

BOILING WATER REACTOR NUCLEAR FUEL ASSEMBLY LIFTING SUPPORT

FIELD OF THE INVENTION

The present invention relates to handling of nuclear fuel assemblies. More specifically, the present invention provides a fuel assembly and a lifting support for a fuel assembly to aid in the lifting of a boiling water reactor nuclear fuel assembly.

BACKGROUND INFORMATION

Lifting of heavy objects, such as fuel assemblies, is a necessary activity performed for safe and continuous operation of nuclear power plants. Lifting of such nuclear fuel assemblies is often strictly regulated with varying precautions being undertaken prior to actual load lift. Typical precautions include, for example, ascertaining the weight of the assembly, determination of a path that the assembly will take during the lift, identification of critical and/or safety sensitive nuclear related components which may be jeopardized during the lift, and evaluation of potential damage in the event of a load drop.

Fuel assemblies provided for boiling water nuclear reactors are composed of a plurality of fuel rods which are supported at a lower end by a lower nozzle or end fitting. A top nozzle or end fitting is located above the plurality of rods. Water rods are interspersed in the plurality of fuel rods to help channel coolant flow and moderate the nuclear reaction. Between the upper and lower nozzles or end fittings, a plurality of spacer grids are positioned at intervals to provide lateral support and prevent potentially destructive side to side movement of individual fuel rods. The fuel assembly top nozzle and bottom nozzle may be configured to aid in channeling coolant flow through the assembly during operation, the bottom nozzle accepting coolant flow and the top nozzle discharging coolant from the assembly in the case of a conventional boiling water reactor fuel assembly. In this typical configuration, the weight of the fuel rods is supported by structures such as an internal water channel, the water rods, inert rods or tie rods during fuel assembly load lift.

Certain areas in a nuclear power plant are more safety sensitive and require extremely thorough procedures to ensure continued health and safety of the public at large. Such safety sensitive areas include, among other areas, the nuclear reactor itself and the fuel pool. The presence of potentially large amounts of radioactive materials in these areas, as well as vital cooling systems, requires the utmost care when lifting is performed. The resulting required safety in these areas necessitates additional checks before load lift. A typical check usually involves, for example, inspecting the structural components of the polar crane or a fuel handling crane. In addition to inspecting the crane, the actual load lifted (i.e. the fuel assembly itself) is inspected and evaluated.

Nuclear plant operating experience indicates that when typical materials used in nuclear reactors are exposed to radiation over 62 Mwd/kgU, these materials may start to degrade. Specific experience shows a potential for stress corrosion cracking, hydrogen embrittlement and irradiation hardening which may challenge the structural integrity of both tie rods and water rods as well as other components used in lifting a fuel assembly with current designs. Currently, structural members used for a load lift of boiling water reactor fuel assemblies may be composed of a zirconium alloy with a thickness of less than 0.03 inches. Although weight reduction is achieved, the minimal corrosion allowance provided for these members from corrosion is a serious potential problem during load lift. As a typical potential problem, water rods, which may also be used to carry the fuel assembly load, are normally exposed to coolant on both inner and outer surfaces, which in turn increases the possibility of corrosion on these surfaces. Additionally, as a result of this exposure, hydrogen embrittlement of the water rod may occur. The water rod hydrogen concentration may approach 500 to 700 ppm, thereby requiring a reduction in load carrying capability for the assembly components. If these problems occur, current practices in the nuclear industry require costly and time consuming alterations to fuel assemblies which are exposed to radiation at or near this level of radiation, which are mechanically damaged, or for fuel assemblies which may have hydrogen embrittlement. To correct these problems, complete disassembly of the fuel assembly and reconstitution of the fuel assembly may be needed with new parts installed in the fuel assembly.

New (unirradiated) fuel assemblies also present other load lift difficulties. New fuel assemblies must be lifted by a special lifting device to allow for sufficient structural lift capacity over critical plant/safety sensitive areas. These special lift devices often provide complicated structures which may include connecting bolts, bayonet mounts, compression springs and washers to transfer the weight of the assembly from the fuel assembly to the crane.

There is a need to provide a lifting support for a boiling water nuclear fuel assembly to eliminate complicated structural support mechanisms currently used in existing nuclear fuel assembly configurations.

There is a further need to provide a lifting support for a fuel assembly for new (unirradiated) fuel handling operations.

There is a still further need to provide a configuration that will allow repair of fuel assemblies which exhibit stress corrosion cracking problems, hydrogen embrittlement, irradiation hardening or other similar load path defects without incurring costly and time consuming alterations to the fuel assembly.

SUMMARY

It is an object of the present invention to provide a lifting support for a boiling water nuclear fuel assembly to eliminate current complicated structural support mechanisms.

It is a further object of the present invention to provide a lifting support for a fuel assembly for initial (new) fuel handling operations.

It is a further object of the present invention to provide a repair to fuel assemblies which exhibit stress corrosion cracking problems, hydrogen embrittlement, irradiation hardening or other similar load path defects without incurring costly and time consuming alterations.

The invention comprises a lifting support for a boiling water reactor nuclear fuel assembly comprising a grappling head configured to allow attachment of a lifting device, a body with an upper end and a lower end, the upper end connected to the grappling head, the body configured to be inserted into a water channel of a boiling water reactor nuclear fuel assembly, and an end connected to the lower end, the end configured to be accepted by the water channel of the nuclear fuel assembly.

The invention also provides a fuel assembly. The fuel assembly for a boiling water reactor comprises a fuel channel configured to define a volume, the channel having a lower end and an upper end, the lower and the upper ends open, a plurality of rods with a lower end and an upper end placed within the volume, the plurality of rods containing fissile material to produce a nuclear reaction, a lower tie plate configured to support the plurality of rods, the lower tie plate configured to join with the fuel channel lower end to allow flow of coolant from the lower tie plate through the channel and the plurality of rods, a removable upper tie plate configured to be attached to the fuel channel, a water channel placed within the volume and connected to the lower tie plate, the water channel configured to channel coolant flow from the lower tie plate, the water channel further configured with an attachment end, a removable reinforcement configured with a grappling head to allow attachment to a lifting device, a body with an upper end and a lower end, the upper end connected to the grappling head, the body configured to be inserted into the water channel of the boiling water reactor nuclear fuel assembly, and an end connected to the lower end, the end configured to be accepted by the water channel attachment end, a plurality of spacers positioned between the lower tie plate and the removable upper tie plate, the plurality of spacers configured to maintain individual fuel rod positions of the plurality of rods, and a lower nozzle, the lower nozzle configured to channel fluid to the lower tie plate and the water channel, the nozzle connected to the fuel channel.

DETAILED DESCRIPTION

Figure 1:
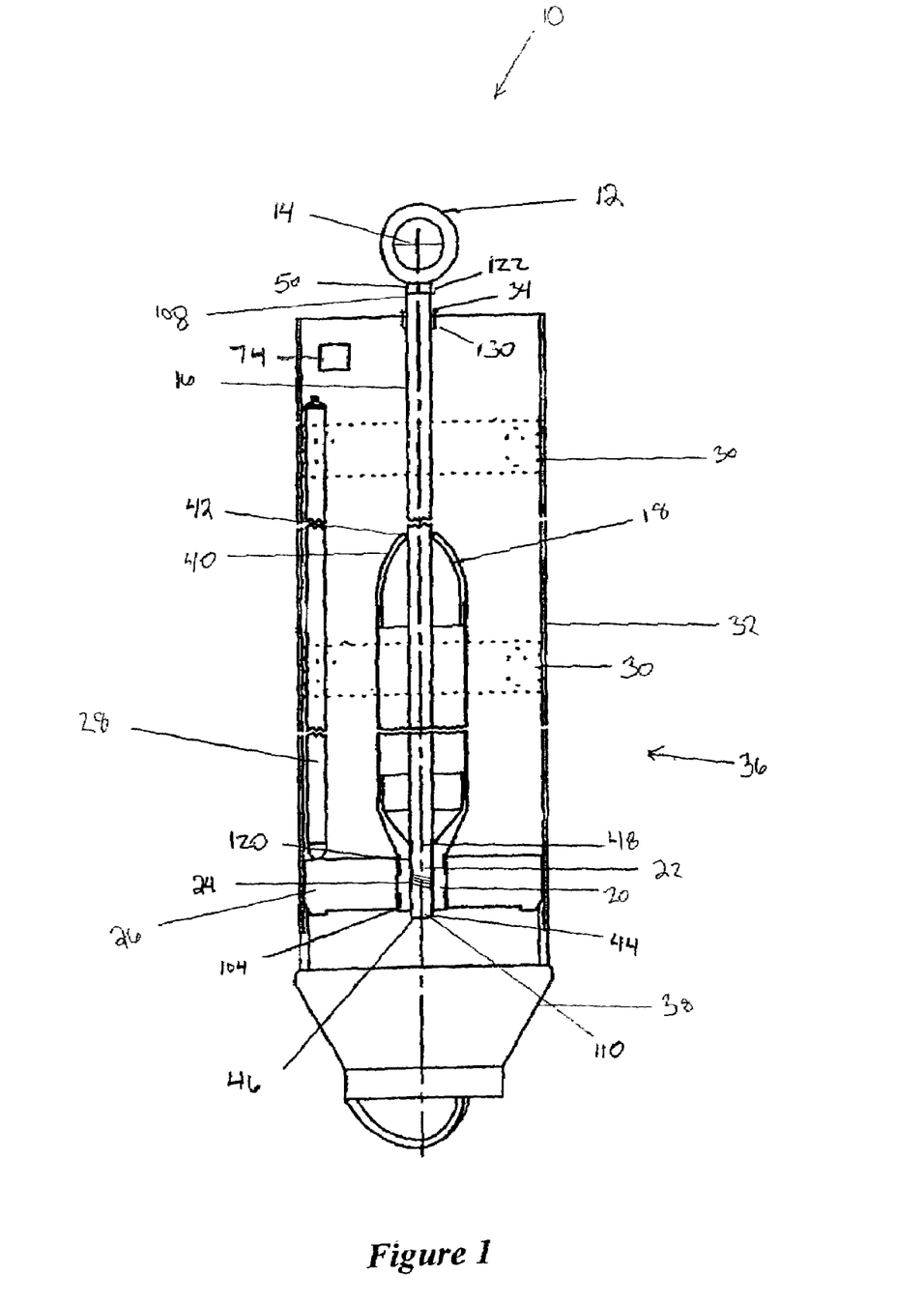
FIG. 1 is a vertical cross-section of a boiling-water reactor nuclear fuel assembly with a lifting support installed.

Referring to FIG. 1, a lifting support 10 is illustrated. The lifting support 10 allows a fuel assembly 36 to be lifted by a lifting device such that the fuel assembly 36 is transported in one piece. The lifting support 10 may be configured from metal or other material such that the lifting support 10 has sufficient load carrying capacity for expected service. Typical service may include a capacity to lift ten times the load of the attached fuel assembly 36, as an example. Other capacities, either higher or lower, may be used. Typical materials which may be used include stainless steel or other non-corroding material. Types 304 and 18-8 stainless steel may be used as an example. Design loadings for the lifting support 10 may include dead weight of the fuel assembly, dead weight of the lifting support 10, impact loading, anticipated seismic loadings for vertical and horizontal planes, impulse loading and other loading. The lifting support 10 may also be configured to perform lifting capabilities over an extended period of time, therefore deformation from creep and cyclical loading may also be considered.

The lifting support 10 is configured with a grappling head 12. The grappling head 12 is configured with an inner open diameter 14 to allow attachment of a hook, slings or other lifting device thereby allowing lifting of the fuel assembly 36. The inner open diameter 14 may be configured of any size, such that it is sufficient for attachment of the lifting device. Typical sizes may include 12 inches, but the size may be varied according to the application needs. The grappling head 12 may be configured such that anticipated sheer, tension and bending forces may be transferred through the head 12 without significant deformation or structural weakening. The grappling head 12 may also have any desired configuration, including circular, square or other geometric shape to allow necessary access by the lifting device.

A body 16 is attached to the grappling head 12 at an upper end 122. The body 16 may be configured of the same material as the grappling head 12 or may be a different material. If a differing material is used, then a connection between the body 16 and the head 12 shall allow load transfer between the body 16 and the head 12. The body 16 may be configured in a cylinder (rod) shape out of stock material or may be configured with all-thread stock or similar material. As with the grappling head 12, the body 16 may be configured for all anticipated design loads from the fuel assembly 36 such that proper load transfer is accomplished as well as to fit into a water channel 18.

A water channel 18 positioned in the interior of a fuel assembly 36 allows water entering the lower nozzle 38 to be channeled up through the fuel assembly 36 thereby cooling the fuel rods 28. The water channel 18 is configured with an attachment end 104 which is configured to allow connection of the lifting support 10. The water channel 18 may be configured with an upper end 40 with differing configurations to allow differing flow conditions for the fuel assembly 36.

The fuel rods 28, as illustrated in the current example, may be full length fuel rods, however other configurations may be used, wherein part length fuel rods, or mixtures of part length fuel rods and full length fuel rods are possible. The fuel rods 28 provide a fissile material, typically in the form of pellets, to allow a nuclear chain reaction. The fuel rods 28 have a cladding around the fissile material to protect the fissile material from coolant flow and mechanical damage. Typical cladding materials may include zirconium alloys, thereby providing sufficient corrosion protection while providing a relatively small neutron capture cross-section. The fuel rods 28 are supported by the lower tie plate 26 to provide a desired spacing between individual rods 28. The water channel 18 is configured with a bottom end 20, which in the example embodiment illustrated, rests on a lower nozzle 38, however, other configurations are possible. The water channel 18 may be constructed such that an attachment between the channel 18 and the nozzle 38 may be through a screw fitting or other mechanism. The water channel 18 may be configured with an opening 42 which is adapted to receive the body 16 of the lifting support 10. The channel 18 may also be threaded at several positions for instance when all-thread material is used for the body 16. If the water channel 18 is configured with an opening 42 which is of lesser diameter than the outside diameter 34 of the body 16, the opening 42 may be widened to a diameter such that the outside diameter 34 allows engagement. A lower nozzle 38 allows coolant to be accepted into the fuel assembly 36 and transported to the water channel 18 and the lower tie plate 26. Spacer grids 30 are positioned between the upper tie plate and the lower tie plate 26. The spacer grids 30 are configured to maintain relative positions of individual fuel rods 28 within the volume defined by the fuel channel 32. The spacer grids 30 may be provided with vanes to provide a mixing of coolant circulating within the fuel assembly 36. The spacer grids 30 may be positioned to maximize critical power within the fuel assembly and to provide sufficient safety margin with respect to departure from nucleate boiling.

An end 22 is attached to a lower end 120 of the body 16. The end 22 may be configured with threads 24 so that the end 22 may be accepted and/or attached to the water channel 18 which may have a corresponding matching thread surface. The number of threads used on the end 22 and the channel 18 may be varied such that either a coarser or finer screw engagement is established. The material used to engage the surface of the end 22 may be chosen such that it provides a relatively softer contact surface, thereby protecting the fuel assembly 36 from damage during installation and removal of the lifting support 10. Engagement of the end 22 to the channel 18 may be by rotating the lifting hook or device such that a desired engagement is established.

Figure 1A:
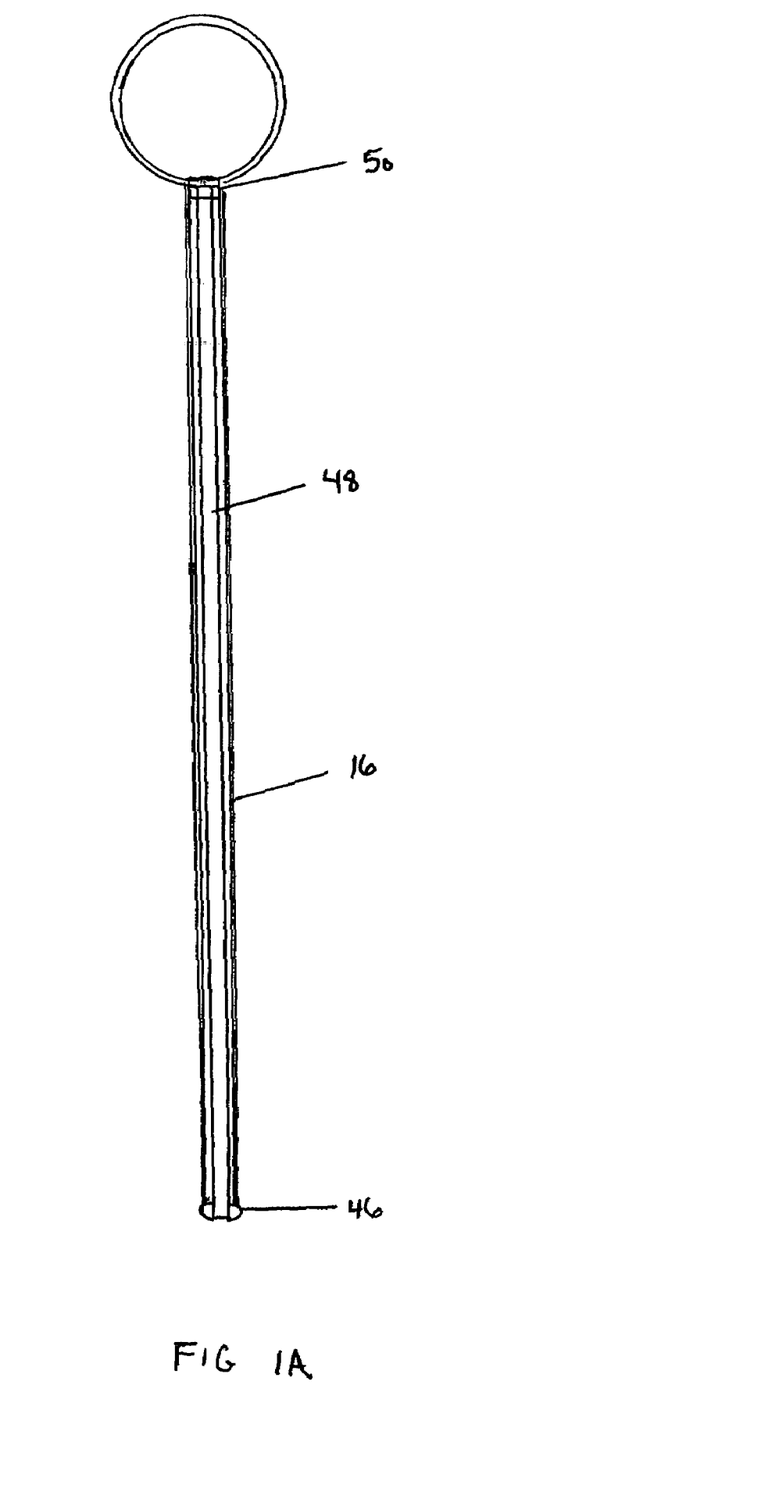
FIG. 1A is a cross-section illustrating an inner rod, an actuator, including the connection to the actuator, a ball lock end and a connection of the ball lock end to the inner rod.

In an alternative exemplary embodiment, the body 16 of the lifting support 10 may be configured with an actuator 50. The actuator 50 may be a spring-loaded push button actuator or a remotely controlled actuator. In this embodiment, the body 16 of the lifting support 10 is configured to define an interior volume such that it is hollow with an inner rod 48 which has a first end 108 and a second end 110. The inner rod 48 connects the actuator 50 to a ball-lock end 46. Upon actuation, the actuator 50 moves the inner rod 48, thereby causing the ball lock end 46 to project from the extension 44 of the lifting support 10. The extension 44 may be configured such that it extends a sufficient amount to allow the ball-lock end 46 to be actuated. The ball lock end 46 may be configured to provide a load lifting capacity appropriate for necessary design considerations, such as dead weight, and seismic loading for the fuel assembly 36 through connection to the lower tie plate or water channel for examples, through a sheer connection as a further example. The inner rod 48 may also be configured to support the entire weight of the fuel assembly 36, thereby allowing full load transfer from the ball-lock end 46 through the inner rod 48 to the grappling head 12. In any embodiment, a spacer 130 may be attached to the body 16 of the lifting support 10 to limit unintended contact between the fuel assembly 36 and the lifting support 10. The spacer 130 may be configured from a material that is softer than materials of the fuel assembly thereby preventing marring of fuel assembly surfaces. As an example, the spacer 130 may be manufactured from a plastic suitable for high temperature and anticipated radiation dose levels. The spacer 130 may be removable from the body 16.

FIG. 1A illustrates the inner rod 48, the actuator 50, including the connection to the actuator 50, the ball lock end 46 and the connection of the ball lock end 46 to the inner rod 48.

Figure 2:
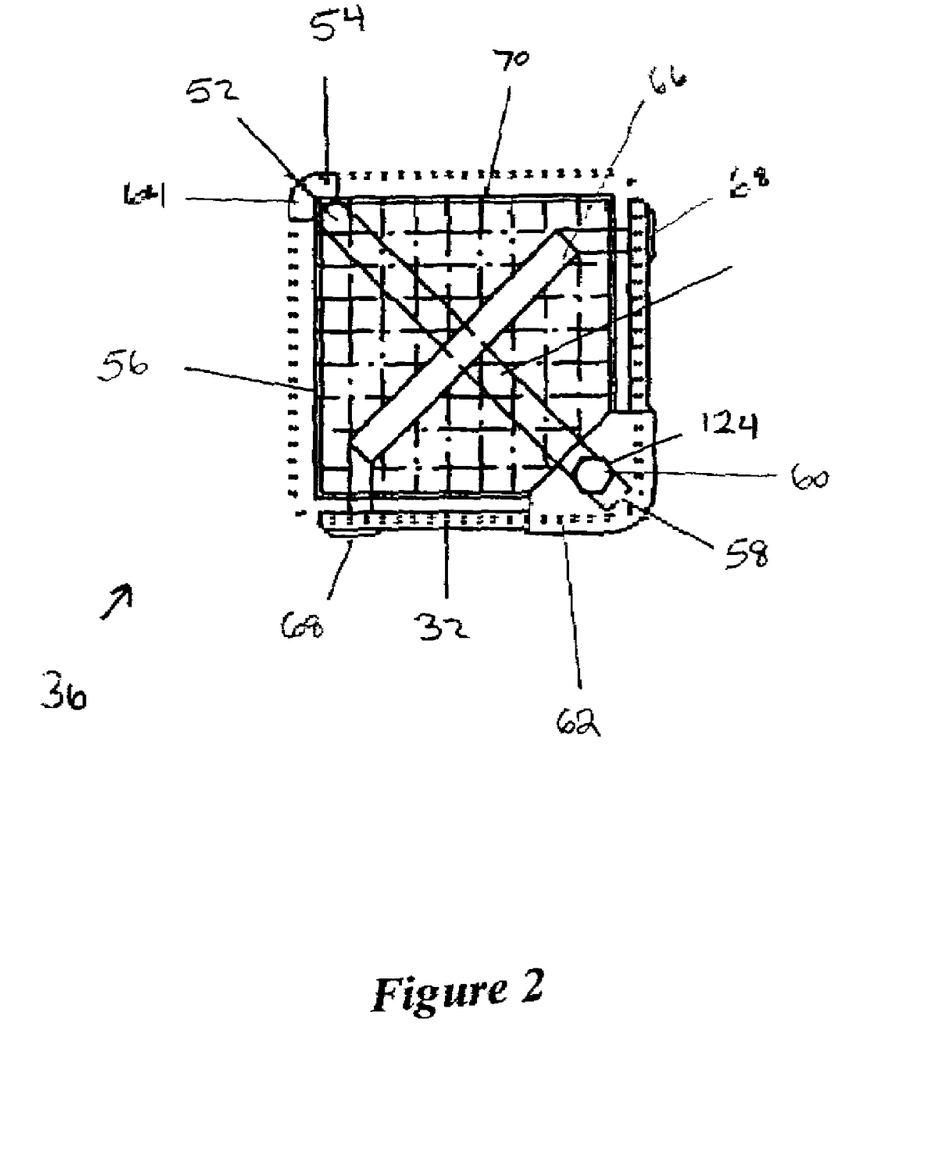
FIG. 2 is a top view of a tie plate/fuel channel connection.

Referring to FIG. 2, an upper end of the fuel assembly 36 is illustrated. A bolt 52 is inserted into a slot A 54 through to a slot B 58 in the fuel channel of the fuel assembly 36. The bolt 52 is inserted into slot A 54 and slot B 58 in such a way that the bolt 52 is positioned through a removable upper tie plate 70 not shown in FIG. 1 for clarity. The bolt 52 may be sized such that the external diameter of the bolt 52 fits into an interior diameter of slot A 54 and slot B 58 of fuel channel 32 and through upper tie plate 70. The bolt 52 has an attached bolt head 64 which is configured such that placement of the bolt 52 into slot A 54 will be stopped by impact of the bolt head 64 on the fuel channel 32 of the fuel assembly 36. The bolt 52 may be manufactured of any material, including non-corrosive metals, to allow proper load transfer and sheer capacity for expected service ranges. The bolt 52 consequently may be manufactured from stainless steel type 304 or other appropriate material. The bolt 52 is configured with a hole 124 with a machined surface, such as screw threads. A screw 60 with matching screw threads to the bolt 52 mechanical surface maybe inserted through a top plate 62 into the bolt 52 to establish a connection between the bolt 52 and the screw 60. The screw 60 may be configured with match markings to allow easy identification of bolt size and material type, as well as relative positioning with respect to the bolt 52. Both the bolt 52 and the screw 60 may additionally be manufactured with an additional hole to allow connection of a retaining arrangement to allow retention of the bolt 52 or screw 60 such that the bolt 52 or screw 60 do not become dislodged and potentially lost in the reactor or fuel pool thereby eliminating foreign material exclusion concerns. As an alternative, the screw 60 may be manufactured such that is will not become dislodged from the top plate 62, thereby reducing foreign material exclusion concerns.

The top plate 62 is attached to the fuel assembly 36 through the fuel channel 32. The fuel channel 32 may be configured of metal or other appropriate material to limit bending of the fuel rods of the fuel assembly 94. The fuel channel 32 defines a volume for the fuel rods and allows the fuel assembly 94 to be handled without damage occurring to the fuel rods. Although illustrated as a relatively thin box like member, other configurations to provide structural rigidity are possible. In a typical installation, the fuel channel 32 wall thickness is three to four times the thickness of either the tie rods or water rod wall thickness. The overall fuel channel size 32 also results in a much larger overall cross-sectional area as compared to tie rod configurations. The larger overall cross-sectional area thereby results in a decreased overall stress during load lifts. The fuel channel 32 is configured with an open top and bottom, wherein the top allows insertion and removable of the removable upper tie plate 70 and the bottom is configured to join to the lower nozzle 38.

A member 66 may be attached to the fuel channel 32 by an attachment 68. The member 66 allows transfer of load from the fuel assembly 36 through the fuel channel 32 to a lifting device. The attachment 68 is therefore configured with sufficient sheer, tension and bending capacity to allow load transfer. The attachment 68 may be configured as a welded attachment or bolted attachment as an example. The member 66 may be configured with a safety factor of 10 to 1 of load lifted to ultimate capacity or other appropriate load capacity according to the load to be lifted. The top plate 62 is connected to the fuel channel 32 through a connection type such as welding or bolting. The screw 60 may be configured such that the screw threads match the corresponding hole 124 in the bolt 52 allowing for completion of the connection. Although illustrated as a hexagonal head screw 60, other configurations are possible and that the embodiment illustrated is merely exemplary.

Figure 3:
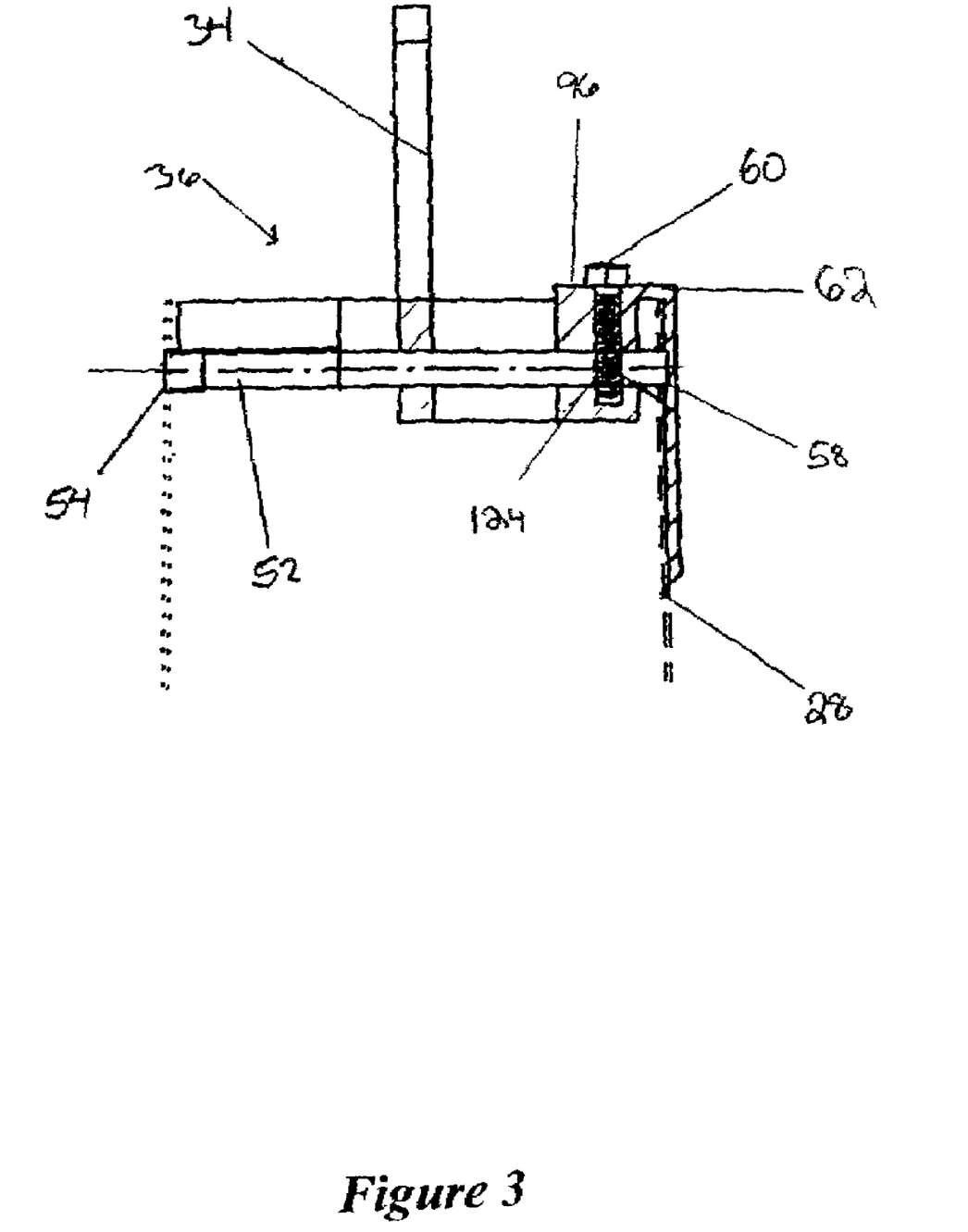
FIG. 3 is a side cross-sectional view of the tie plate/fuel channel connection of FIG. 2.

In FIG. 3, a side cross-sectional view of FIG. 2 is illustrated. The screw 60 attaches to the bolt 52 through hole 124 thereby providing a connection between the fuel channel 32 and the fuel assembly 36. A structure 96 is provided around the placement of the screw 60 to allow load transferred from the bolt 52 to be transferred to the channel 32 with minimal bending. The structure 96 may be increased or decreased in size according to the amount of load transferred along the bolt 52, the desired resistance to deflection, and sheer forces expected. The screw 60 and the bolt 52 may have markings located on their respective heads to allow identification of material type, length, relative positioning, thread length, and numbers of threads per unit length.

Figure 4:
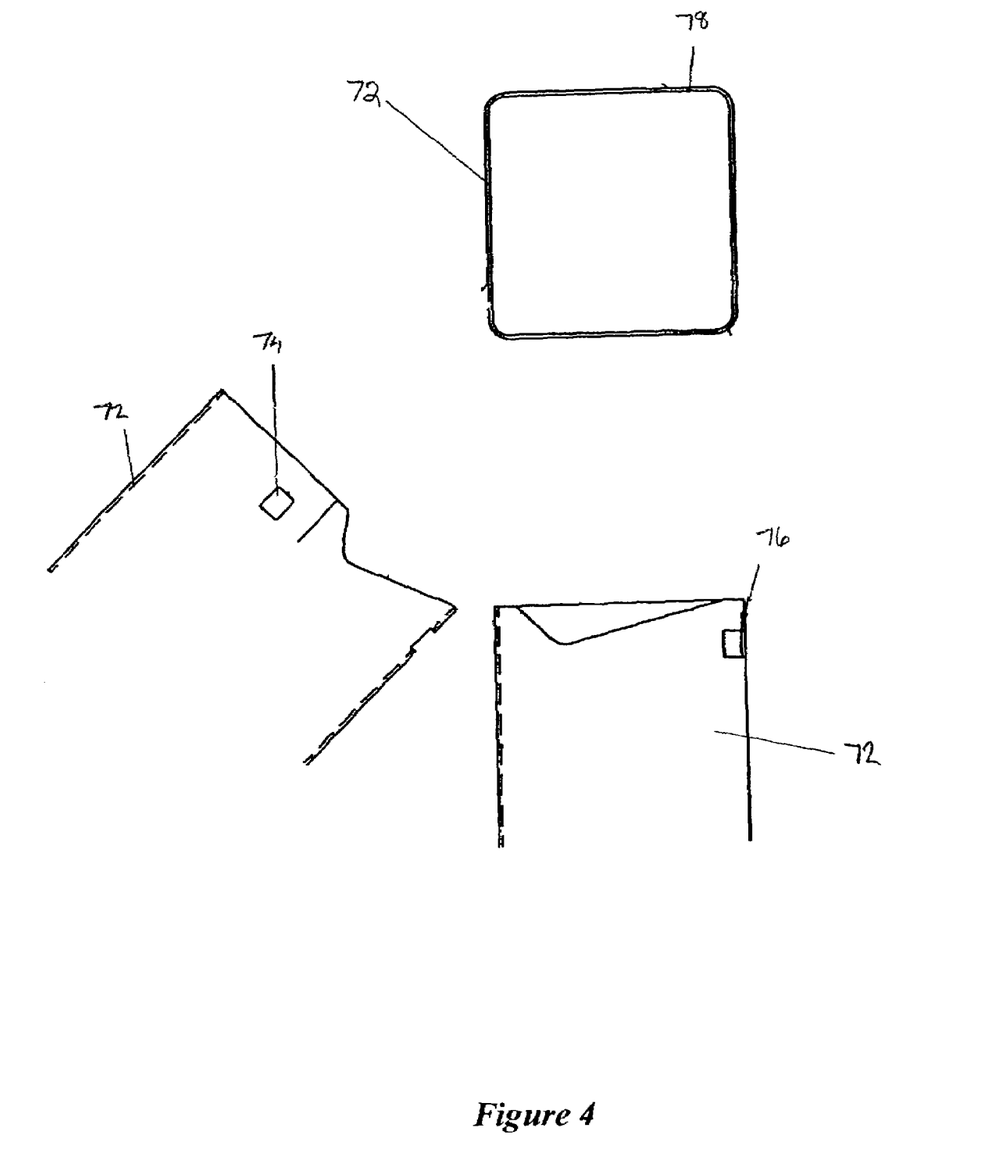
FIG. 4 is a side view of an alternative tie plate/fuel channel connection.
Figure 5:
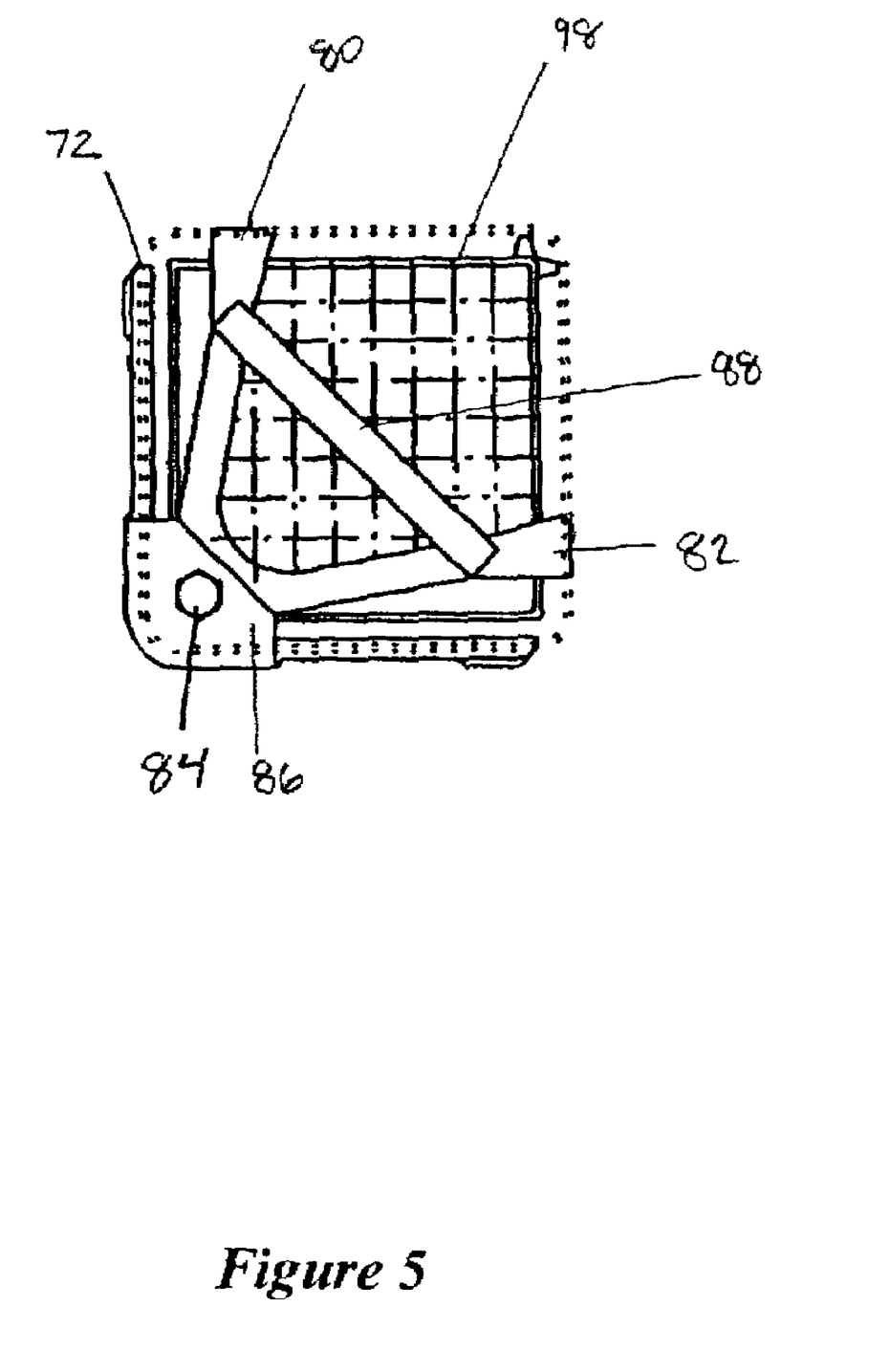
FIG. 5 is a top view of a tie plate connection with two lugs.
Figure 6:
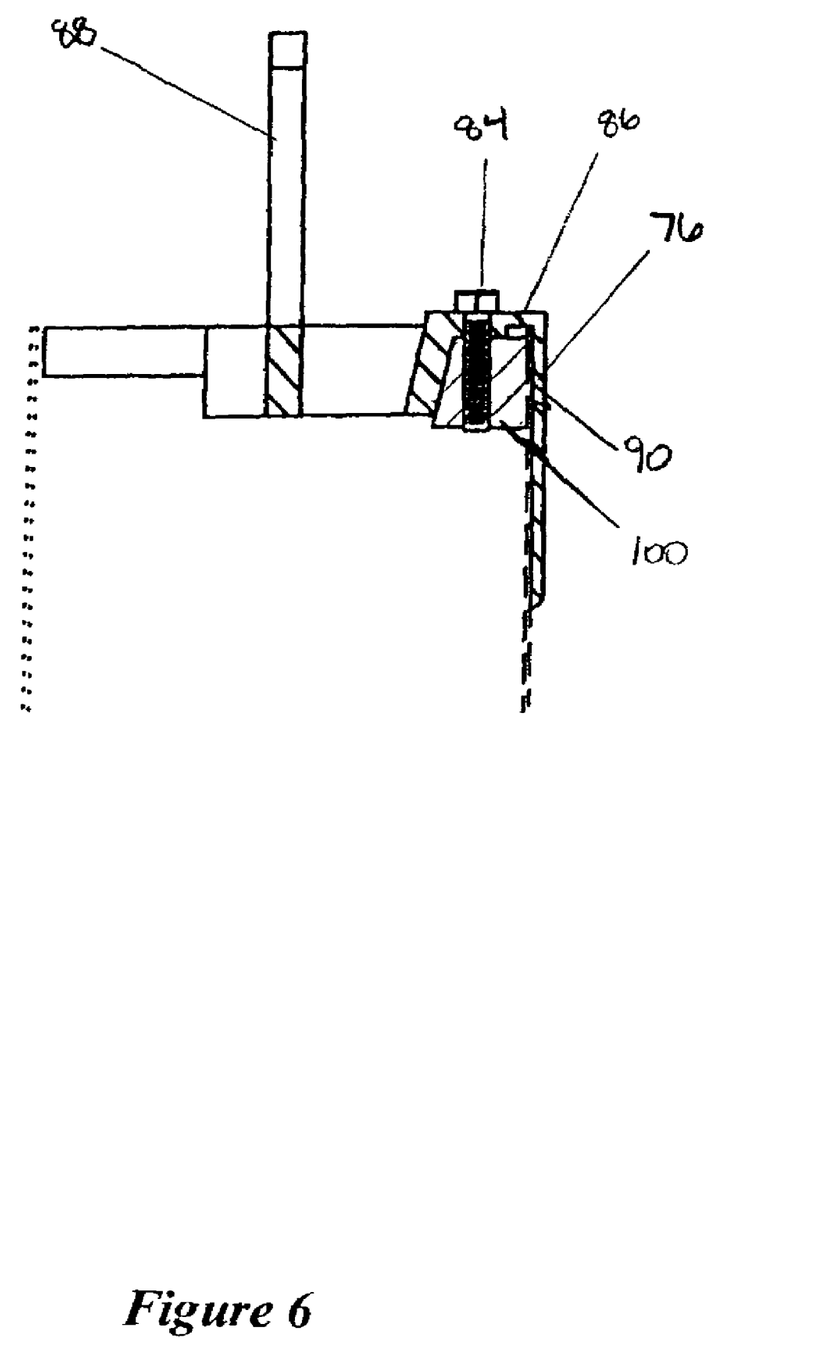
FIG. 6 is a side view of the tie plate connection of FIG. 2.

In FIGS. 4, 5 and 6, a second embodiment of a connection between a alternate fuel channel 72 and a removable upper tie plate 98 of a fuel assembly 36 is illustrated. FIG. 4 illustrates a top end of a fuel channel 72. The top end of the fuel channel 72 is configured with a slot A 74, a slot B 78 and a slot C 76. The purpose of the slots 74, 76 and 78 is to allow attachment of the removable upper tie plate 98 (illustrated in FIG. 5) to the fuel channel 72. As illustrated in FIG. 5, the removable upper tie plate 98 has two lugs 80, 82 that engage slot A 74 and slot B 78 of the fuel channel 72. Slot C 76 is engaged by a third lug C 90. Installation of the removable upper tie plate 98 is accomplished by tilting the tie plate 98 grid and sliding lugs A and B 80,82 into corresponding slots A and B 74, 78 of the fuel channel 72. The corner at lug C is then lowered until the underside of the screw 84 rests on a wedged block 100 illustrated in FIG. 6. The tie plate 98 is then locked by tightening the screw 84. When tightened, the wedged block 100 is drawn upwards and into slot C 76, thereby locking the removable upper tie plate 98. Load transfer from the screw 84 to the fuel channel 72 occurs through a top plate 86 which connects the lugs 80, 82, 90 to the channel 72. The lugs 80, 82 and 90 may be configured such that shear, tension and bending loads from the assembly are transferred along the lugs 80, 82, 90 without significant structural deterioration. A bail 88 is attached to lugs 80, 82 to provide an attachment point for a lifting device. The bail 88 may be configured with a sufficient opening to allow a hook, sling or other device to be attached, allowing load lift. Although described as a screw 84, other configurations are possible such as a bolt and the exemplary embodiment illustrated should not be considered limiting. The screw 84 may be configured with identification markings on the head to allow determination of material type, thread length, number of threads per inch, and relative positioning.

The present invention provides many improvements over prior configurations. The present invention allows elimination of the connecting bolt, bayonet bolt, compression spring, washer and locking device used in other configurations. The present invention provides a less complex design while providing heavy load lift functionality. The present invention may be configured to provide lifting capability for fuel assemblies from differing manufacturers. The present invention uses fewer overall quantity of materials, thereby decreasing eventual final storage and disposal of radioactive material.

The present invention is configured to permit easy installation and removal of the lifting support in both a manufacturing facility and a "field" location at a nuclear reactor site. The body of the lifting support may be sized to fit into existing water channels limiting expensive alterations to current fuel assembly designs. The present invention also provides superiority over other configurations as the simple, easily understood configuration allows manipulation by mechanics skilled in the nuclear maintenance field. Less overall mechanical parts decreases the possibility of inadvertent error in design and maintenance activities.

In the case of a repair to a used boiling water reactor nuclear fuel assembly, the current invention also allows workers to repair the assembly underwater or from a shielded environment, thereby protecting workers from radiation exposure. Repairs employing the lifting support, due to their simple construction, involve a shorter repair period also protecting workers from inadvertent radiation exposure.

Operationally, a fuel assembly with attached lifting support is delivered to a nuclear reactor refueling floor or other refueling area. In this example embodiment, the fuel assembly is delivered in a shipping crate to protect the assembly during transit. The shipping crate is positioned such that the fuel assembly stands on end, head up, similar to the configuration of the typical assembly installed in a nuclear reactor. The shipping crate is opened and a crane, such as an overhead polar crane, is connected to the grappling head of the lifting support. The fuel assembly is then lifted and placed in a fuel assembly stand, where it may be inspected prior to incorporation into the reactor according to the operating procedures of the reactor. After inspection, a fuel channel is then lifted over the top of the fuel assembly and slid into position around the periphery of the entire fuel assembly, thereby providing additional structural support for the fuel assembly. The lifting support is then unscrewed from the attachment point to the water channel while being supported by the crane. Next, the removable upper tie plate is positioned at the top of the fuel rods at the top end of the assembly. An upper bolt then passes through slot (A) and through horizontal hole(s) in the tie plate cast member(s) and protrudes through slot (B) of the fuel channel. A channel fastener screw is then installed such that it engages the upper bolt, thereby completing the structural attachment of the fuel channel to the upper tie plate. The fuel assembly may then be incorporated into the nuclear reactor through the polar crane or other lifting device.

In the foregoing specification, the invention has been described with reference to specific exemplary embodiments, thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A lifting support for a boiling water reactor nuclear fuel assembly comprising:
    a grappling head configured to allow attachment of a lifting device;
    a body with an upper end and a lower end, the upper end connected to the grappling head, the body configured to be inserted into a water channel of the boiling water reactor nuclear fuel assembly; and
    an end connected to the lower end, the end configured to be accepted by the water channel of the nuclear fuel assembly, wherein the body defines an interior volume and the lifting support further comprises:
    an inner rod with a first end and a second end, the inner rod positioned in the interior volume;
    an actuator connected to the inner rod at the first end, the actuator configured to actuate and move the inner rod; and
    a ball lock end connected to the second end, the ball lock end configured to be actuated by the inner rod, the end further configured to be inserted into a water channel of a boiling water nuclear fuel assembly in a non-extended position and provide a load path for lifting the fuel assembly when in an extended position, the ball lock end positioned at the end connected to the lower end, wherein the lifting support has a length sufficient to insert the ball lock end to an elevation of a single lower tie plate of the fuel assembly.

2. The lifting support according to claim 1, wherein the lifting support is made from stainless steel.

3. The lifting support according to claim 2, wherein the stainless steel is type 18-8.

4. The lifting support according to claim 1, further comprising:
 a spacer located on the body, the spacer configured to limit direct contact between the body of the lifting support and the fuel assembly.

5. The lifting support according to claim 4, wherein the spacer is plastic.

6. The lifting support according to claim 4, wherein the spacer is removable from the body of the lifting support.

7. The lifting support according to claim 1, wherein the ball lock end is configured to engage the water channel in the extended position through a sheer connection.

8. The lifting support according to claim 1, wherein the actuator is a remote controlled actuator.

9. A fuel assembly for a boiling water reactor comprising:
 a fuel channel configured to define a volume, the channel having a lower end and an upper end, the lower and the upper ends open, the fuel channel further configured to channel a flow of coolant;
 a plurality of fuel rods each with a lower end and an upper end placed within the volume, the plurality of fuel rods containing fissile material;
 a lower single tie plate configured to support the plurality of rods, the lower tie plate configured to abut an interior side of the fuel channel lower end and allow flow of the coolant through the single lower tie plate through the channel;
 a removable upper tie plate configured to be attached to the fuel channel, the removable upper tie plate configured to restrict movement of the plurality of fuel rods;
 a water channel placed in the volume and connected to the single lower tie plate, the water channel configured to channel coolant flow from the single lower tie plate, the water channel further configured with an attachment end;
 a removable lifting support configured with a grappling head to allow attachment to a lifting device, a body with an upper end and a lower end, the upper end connected to the grappling head, the body configured to be inserted into the water channel of the boiling water reactor nuclear fuel assembly, and an end connected to the lower end, the end configured to be accepted and retained by the water channel attachment end, the end further configured to be disengaged from the water channel, wherein the body has an interior volume and the lifting support further comprises:
 an inner rod with a first end and a second end, the inner rod positioned in the interior volume;
 an actuator connected to the inner rod at the first end, the actuator configured to actuate and move the inner rod; and
 a ball lock end connected to the second end, the ball lock end configured to be actuated by the inner rod, the end further configured to be inserted into a water channel of a boiling water nuclear fuel assembly in a non-extended position and provide a lead path for lifting the fuel assembly when in an extended position; the ball lock end positioned at the end connected to the lower end, wherein the lifting support has a length sufficient to insert the ball lock end to an elevation of the single lower tie plate of the fuel assembly;
 a plurality of spacers positioned between the single lower tie plate and the removable upper tie plate, the plurality of spacers configured to maintain individual fuel rod positions of the plurality of rods and channel coolant flow; and
 a lower nozzle configured to channel fluid to the single lower tie plate and the water channel, the nozzle connected to the fuel channel.

10. The fuel assembly according to claim 9, wherein the lifting support is made from stainless steel.

11. The fuel assembly according to claim 9, wherein the fuel channel and the removable upper tie plate have matching slots and further comprising:
 a bolt configured with a head and an end, wherein the bolt is positioned through the slot in the fuel channel and the removable upper tie plate to provide a connection between the fuel channel and the removable upper tie plate.

12. The fuel assembly according to claim 11, further comprising:
 a screw configured to be attached to the bolt, wherein the bolt is configured with a head that has a larger diameter than the slot in the fuel channel, the bolt further configured with a hole to accept the screw to form a connection;
 a top plate configured with a hole wherein the screw is inserted, the top plate configured to be removably attached to the fuel channel upper end through an attachment; and
 a member attached to the fuel channel, the member configured to be attached to a load lifting device.

* * * * *